W. W. SCARBOROUGH & W. S. BATES.
Waste-Pipe Trap.
No. 217,243.                    Patented July 8, 1879.
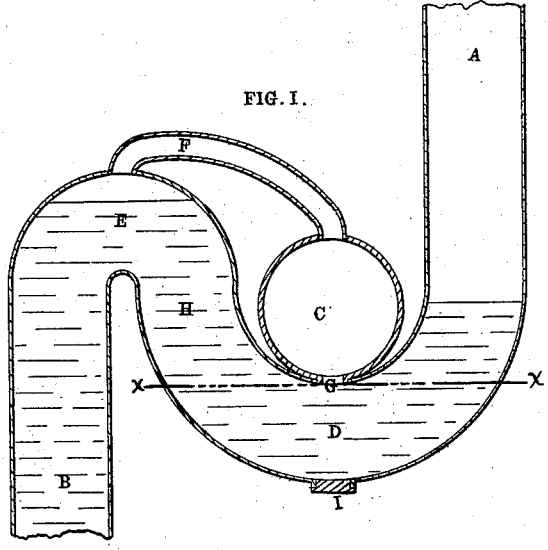
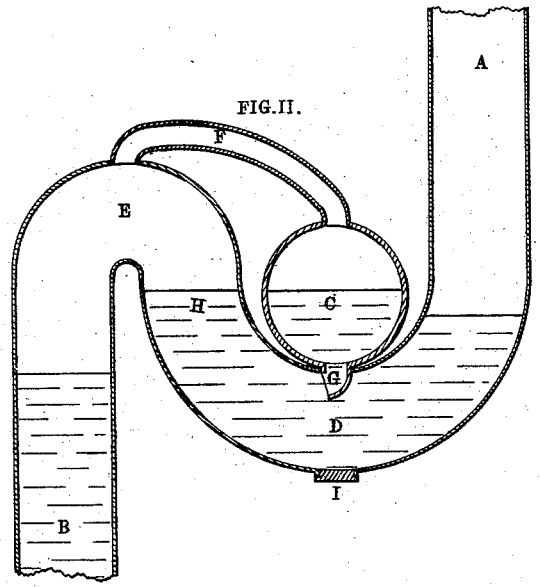

UNITED STATES PATENT OFFICE.

WILLIAM W. SCARBOROUGH AND WILLIAM S. BATES, OF CINCINNATI, OHIO.

IMPROVEMENT IN WASTE-PIPE TRAPS.

Specification forming part of Letters Patent No. 217,243, dated July 8, 1879; application filed May 22, 1879.

*To all whom it may concern:*

Be it known that we, WILLIAM W. SCARBOROUGH and WILLIAM S. BATES, of Cincinnati, Ohio, have invented certain Improvements in Waste-Pipe Traps, of which the following is a specification.

Our invention relates to liquid-seal traps for preventing the rising of deleterious gases, &c., through waste-pipes; and its object is to prevent the siphoning of such traps, by which the sealing-liquid is drawn out and a free passage left for such gases.

Prior to our invention this object was sought to be accomplished in various ways, such as so connecting a reservoir with the trap that when the trap was empty a valve would open and admit sufficient water to the trap to seal it, which was necessarily a somewhat complicated arrangement and liable to get out of order; or a reservoir was connected with the bottom of the lower and upper bends of a gooseneck, the reservoir being made to contain sufficient water to seal the trap, which was obviously a very objectionable construction, as the reservoir would become clogged, so much so that it could not be used on a pipe which discharged pasty or solid matters; or the upper and lower bends of a trap were connected by two legs, one above the other, for the purpose of having a current of air drawn through the upper leg, leaving the sealing-water in the lower leg; but this was obviously imperfect on account of the danger of there being too little water left in the device to seal it, and even when sealed the slightest pressure was sufficient to break the seal.

By our invention we have overcome all these difficulties by placing an air-chamber between the upper and lower bends of the trap, as will be more fully described hereinafter.

In the drawings we have shown our invention as applied to the ordinary S trap.

Figures I and II show the invention at different periods of its action. Fig. II also shows a modified form of connection between the air-chamber and the lower bend of the trap.

A is the inlet end of the trap-pipe; D, the lower bend; E, the upper bend; B, the outlet; C, the air-chamber; F, the passage connecting the air-chamber and the upper bend; G, the orifice between the air-chamber and the lower bend; I, the tap or plug for cleansing, located preferably in line with orifice G.

The operations of flushing and discharging waste matters are ordinarily accompanied by a rush, and this rush is such that in most cases any solid matters discharged will be thrown against the bottom of the lower bend, D, of the trap, and thus clear the orifice G, so that there will be little or no danger of the orifice being clogged. It is for this reason that we prefer to connect the air-chamber C with the top of the lower bend. By this operation of flushing or discharging the waste-pipe is generally filled, so that when the supply at the inlet end is stopped a siphoning action sets in. It is this point of the action which is shown in Fig. I. The supply of liquid at the inlet end A has ceased and the trap-pipe is full.

The column of liquid in H has a tendency to fall toward D, and the column of liquid in B tends to fall toward the outlet; consequently there is a strong suction at the top of the upper bend, E, and air will be drawn from the air-chamber C through the passage F, the water-level will fall in A, H, and B, and water will be sucked up or rise into C, the degree of fall and rise depending on the proportions of the trap; and when the liquid-columns in H and C are in equilibrium, then the water-level will rise in both H and C and fall in A and B until B is empty, or until the level in A is so low that air will pass through the trap at D from A through D H E until the limb B is empty; then, of course, the water will fall in H and C and rise in A and form a perfect seal.

We have found that the larger the air-chamber and the closer its connection with the lower bend, the stronger will be the seal.

A convenient rule for manufacturers is to make the air-chamber of a capacity equal to that of the pipe at D below the line $x\,x$ in Fig. I, which is about the proportion shown in the drawings. It may, however, be made as small as three-fourths of this capacity; but we recommend its being made larger when convenience will permit.

It may, in some cases, be desirable to connect the air-chamber with the lower bend at G by a passage having a forward inclination from the chamber, so that any rush of liquid through A D H will have a sucking action at G, and thus effectually prevent any entry of material into the chamber through G except as hereinbefore indicated. This same effect may be produced by making the connection by a passage opening in the direction of the discharge, as shown in Fig. II. This should especially be done if the opening from the chamber into the trap-pipe is at one side. We prefer, however, as before stated, to make the opening in the top of the trap-pipe; and we prefer to make the upper connection at E, at or near the extreme summit of the upper bend, as is shown.

We claim—

1. The combination, with a waste-pipe trap, of an air-chamber communicating with the lower and upper bends of the trap, substantially as described.

2. The combination, with the waste-pipe trap, of the air-chamber C, communicating therewith at the top of the upper and lower bends thereof, substantially as described.

3. The combination of the waste-pipe trap, the air-chamber communicating with the upper and lower bends thereof, and the tap or plug I, located in line with the opening from the lower bend to the air-chamber, substantially as described.

WILLIAM W. SCARBOROUGH.
WM. S. BATES.

Attest:
R. T. DUNELL,
CLEMENT BATES.